Figures 1, 2, 3:
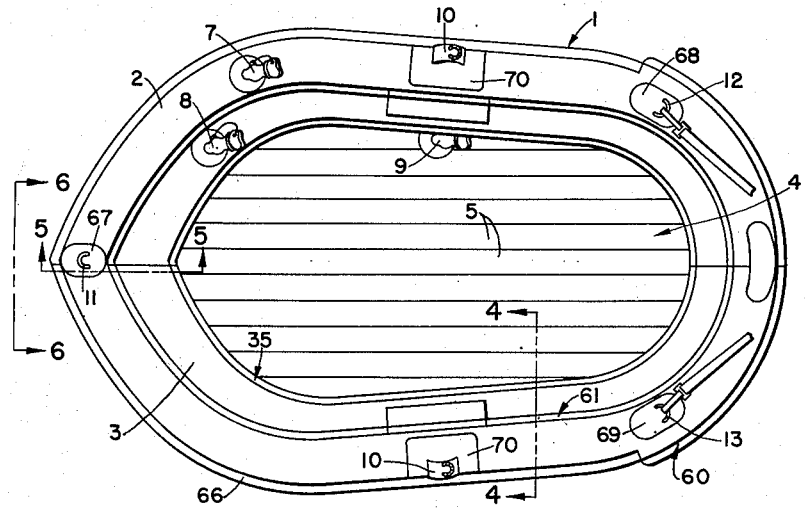

May 16, 1950

M. J. STURTEVANT 2,508,304

PNEUMATIC BOAT STRUCTURE AND METHOD
OF MANUFACTURING THE SAME

Filed June 28, 1946

6 Sheets-Sheet 1

INVENTOR.
MARK J. STURTEVANT
BY R. H. Waters
ATTORNEY

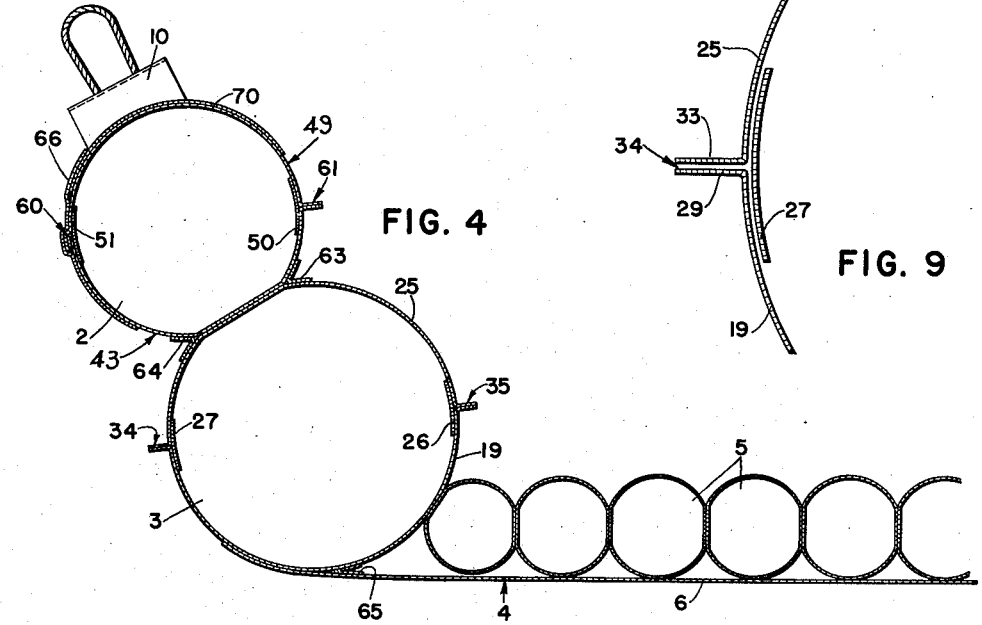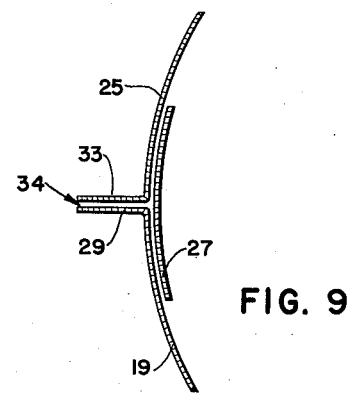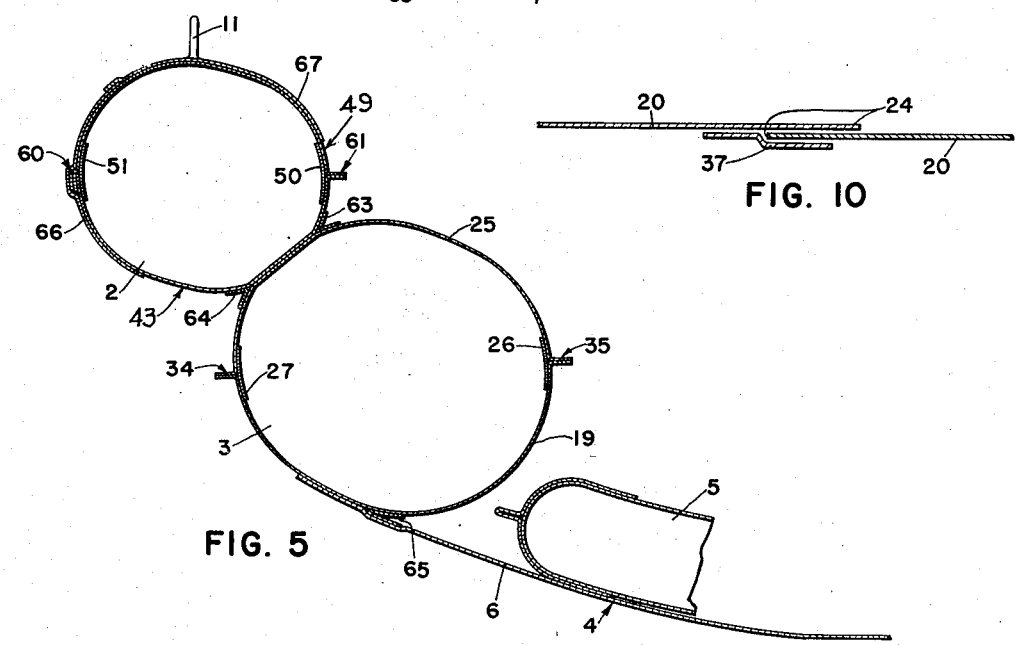

May 16, 1950

M. J. STURTEVANT 2,508,304

PNEUMATIC BOAT STRUCTURE AND METHOD
OF MANUFACTURING THE SAME

Filed June 28, 1946

6 Sheets-Sheet 3

INVENTOR.
BY MARK J. STURTEVANT

ATTORNEY

*INVENTOR.*
MARK J. STURTEVANT
BY
ATTORNEY

May 16, 1950 M. J. STURTEVANT 2,508,304
PNEUMATIC BOAT STRUCTURE AND METHOD
OF MANUFACTURING THE SAME
Filed June 28, 1946 6 Sheets-Sheet 5

*INVENTOR.*
MARK J. STURTEVANT
BY *R H Waters*
ATTORNEY

May 16, 1950     M. J. STURTEVANT     2,508,304
PNEUMATIC BOAT STRUCTURE AND METHOD
OF MANUFACTURING THE SAME

Filed June 28, 1946                     6 Sheets-Sheet 6

*INVENTOR.*
MARK J. STURTEVANT
BY
ATTORNEY

Patented May 16, 1950

2,508,304

UNITED STATES PATENT OFFICE 2,508,304

PNEUMATIC BOAT STRUCTURE AND METHOD OF MANUFACTURING THE SAME

Mark J. Sturtevant, Akron, Ohio, assignor to Wingfoot Corporation, Akron, Ohio, a corporation of Delaware Application June 28, 1946, Serial No. 680,184

4 Claims. (Cl. 9—2)

This invention relates to pneumatic boat structures and the like, as well as to the method of manufacturing the same. More particularly, the invention is concerned with improved forms of inflatable boats, rafts, pontoons, and other similar structures embodying a plurality of generally tubular elements disposed in stacked relation, together with a novel method of assembling such structures in the flat.

One of the problems involved in manufacturing pneumatic boat structures and the like is the difficulty of assembling together the several pieces of rubberized fabric material cut to specific patterns to form the several cooperating elements of the boat and to insure, after their assembly, against the loss of the inflating fluid from the completed structure. All of the individual pieces of fabric material which are cut to a predetermined pattern must be joined together in such fashion that upon inflation the members so formed will present a smooth, regular contour to the structure and retain the inflating fluid for a maximum period of time. It is essential to provide a simple yet satisfactory method of assembling the several pieces of fabric material together in such a way as to provide fluid-tight joints at all of those points where the parts are interfitted.

It is, therefore, an important object of the present invention to provide an inflatable boat structure and the like which possesses a smooth, regularly curved contour from the bow to the stern thereof.

It is another object of the present invention to afford a novel method of constructing pneumatic boat structures and the like by fitting together a plurality of pieces of rubberized fabric material cut to a given pattern on a flat surface in such fashion that when the resulting structure is inflated, it will assume the desired smoothly curved contour of the boat.

Another object of the present invention is to provide a simple and economical method of manufacturing an inflatable boat structure and the like which readily adapts itself to mass production operations.

It is a further object of the present invention to provide an inflatable boat structure and the like embodying a plurality of stacked rail members, each of which comprises a smooth, generally continuously curved contour and is constructed of a minimum number of pieces of rubberized fabric material.

For a better understanding of the teachings of the present invention, reference should be had to the drawings in which Fig. 1 represents a plan view of one type of pneumatic structure in the form of an inflatable boat embodying the teachings of the present invention. Fig. 2 is a side elevation of the boat illustrated in Fig. 1. Fig. 3 represents an enlarged vertical cross-section through the boat of Fig. 2 as seen from the line 3—3 therein with parts broken away. Fig. 4 is an enlarged partial vertical cross-section taken along the line 4—4 in Fig. 1. Fig. 5 is an enlarged fragmentary cross-sectional view as seen from the line 5—5 in Fig. 1.

Figure 6:
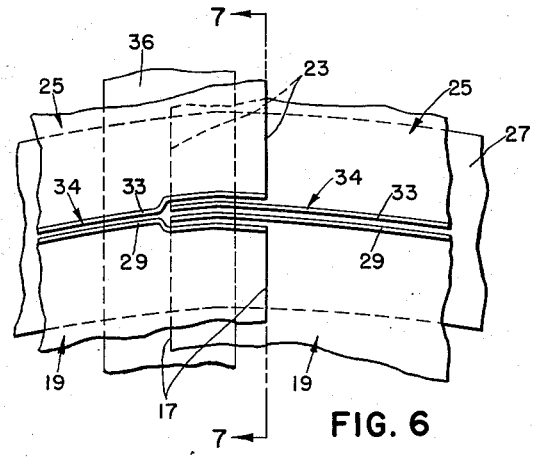
Figure 7:
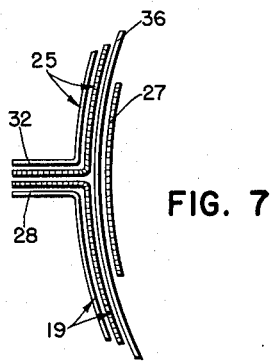
Figure 8:
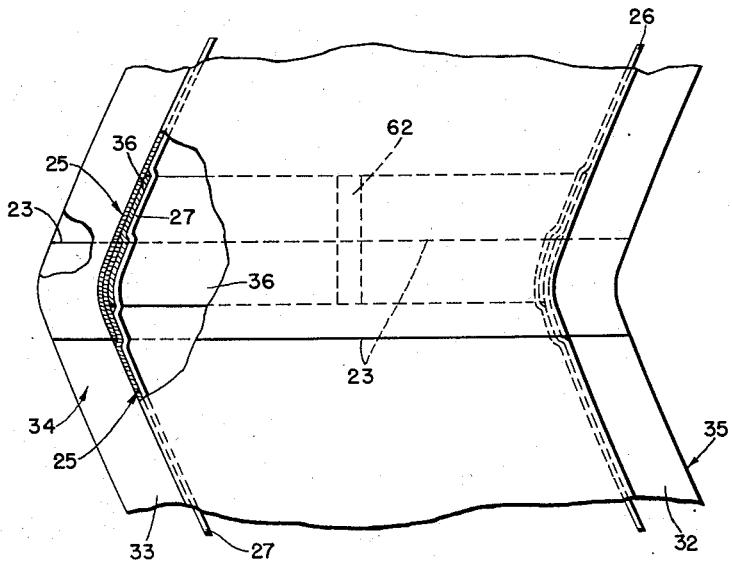
Figure 16:
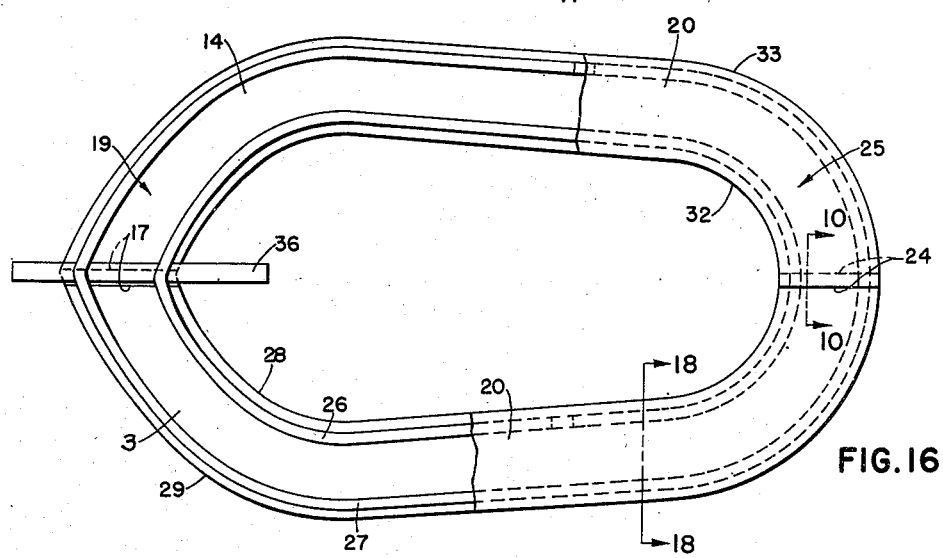

Fig. 6 of the drawings is an enlarged fragmentary elevation of the assembly of the nose portion at the bow of the boat as seen from the line 6—6 in Fig. 1. Fig. 7 is an exploded fragmentary cross-sectional view with parts in elevation showing the joint of Fig. 6 as seen from the line 7—7 therein. Fig. 8 is an enlarged partial plan view with parts in section and broken away to illustrate the bow construction of the boat as seen from the line 8—8 in Fig. 2. Fig. 9 represents a partial cross-section in exploded form as seen from the line 9—9 in Fig. 2. Fig. 10 is a partial cross-section as seen from the line 10—10 in Fig. 16 illustrating the several fabric pieces disposed in exploded relation as they are assembled.

Figure 17:
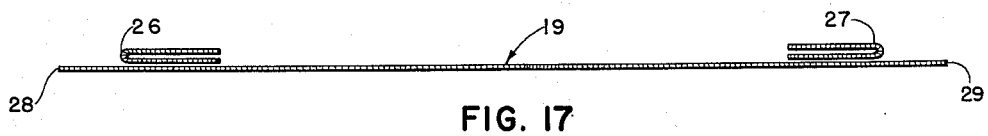
Figure 18:
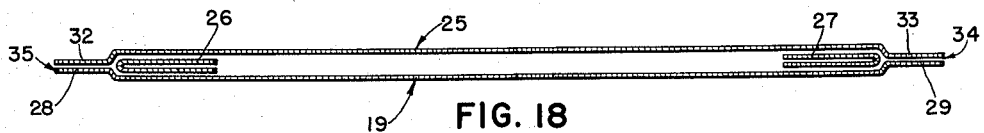
Figure 21:
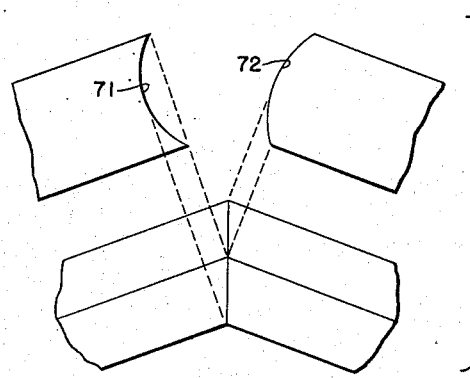
Figure 19:
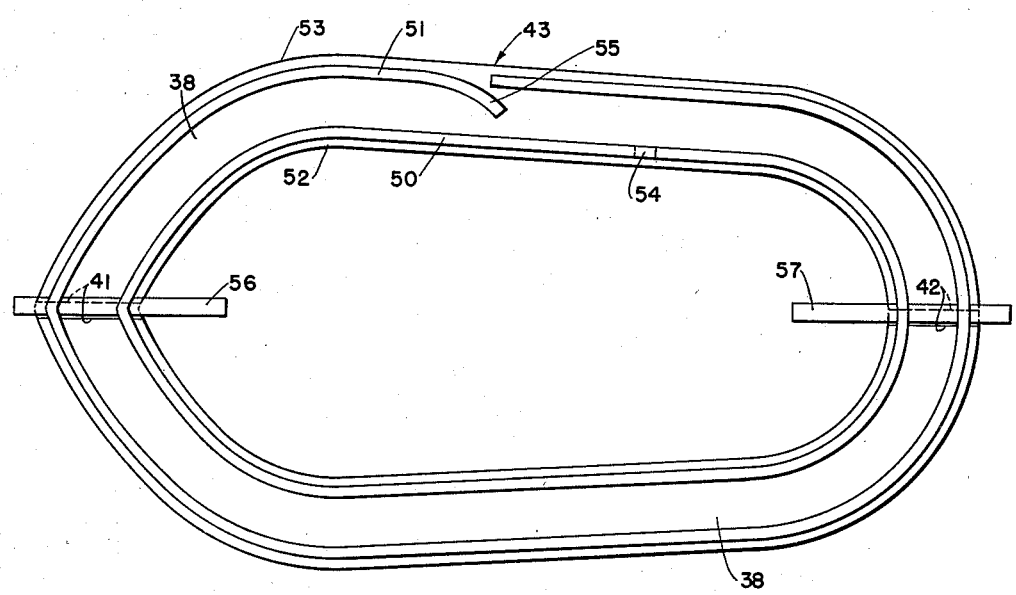
Figure 20:
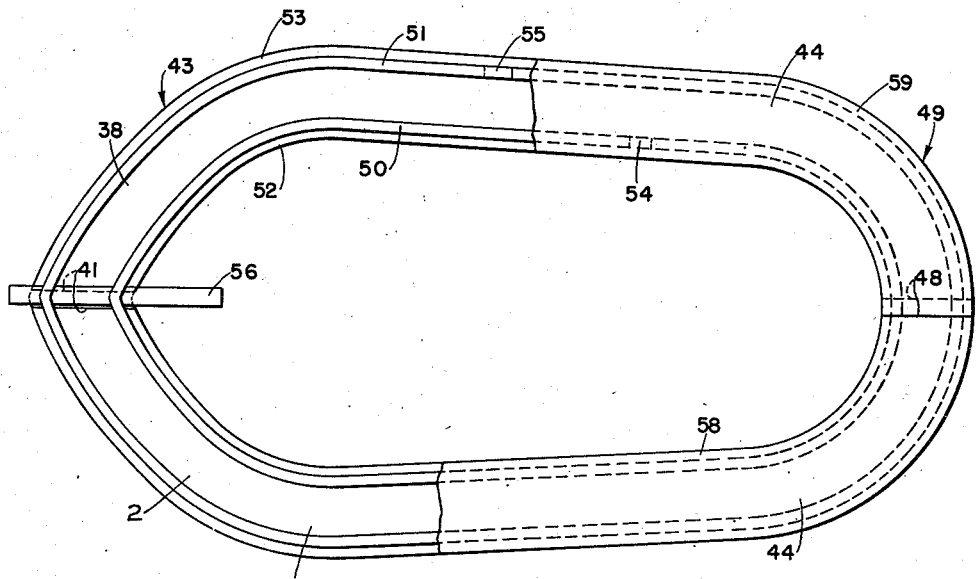

Figs. 11, 12, 13, and 14 illustrate strips of rubberized fabric material cut to patterns for assembly into the boat of Fig. 1. Fig. 15 illustrates a single continuous strip of fabric employed in fabricating the bottom rail member of the boat, said strip being formed by joining two pieces of fabric material at their ends. Fig. 16 illustrates the bottom rail member formed in the flat with part of the fabric removed. Fig. 17 represents an enlarged cross-section along the line 17—17 in Fig. 15 of one of the strips of fabric with a reinforcing tape in place adjacent each of its peripheral edges preparatory to fitting the several strips of fabric together. Fig. 18 is an enlarged cross-section along the line 18—18 in Fig. 16 and illustrates the several superposed strips of fabric and tapes assembled into a completed boat element. Fig. 19 is a plan view of the joined flat strips of fabric employed in fabricating the top rail member of the boat. Fig. 20 illustrates the top rail member assembled in the flat with parts broken away. Fig. 21 is an exaggerated diagrammatic representation of the development of the ends of the fabric pieces.

In the drawings, Fig. 1 illustrates an inflatable boat 1 of the twin-rail type which embodies the teachings of the present invention and is characterized by a plurality of inflatable, generally tubular elements or rail members of substantially continuously curved contour extending from the bow to the stern. The boat 1 comprises a top rail member 2 and a bottom rail member 3, of which the former is preferably of slightly greater circumferential dimension than the latter so as to enable it to provide an overhanging barrier extending about the outer peripheral dimension of the bottom rail member for reasons which will be apparent as the description proceeds. The boat 1 has a floor 4 which comprises a series of axially extending tubes 5, all of which advantageously intercommunicate for unitary inflation and are supported by a sheet of fabric 6 secured to the under-surface of the bottom rail member 3.

The inflation of the boat 1 is accomplished by any convenient means such, for example, as the use of cylinders (not shown) of gas under pressure or by means of a manual pump unit which may be connected to the valves 7, 8, and 9 of the top rail member 2, bottom rail member 3, and floor 4, respectively. A pair of oar-locks 10 affixed to the top rail 2 of the boat 1 are provided for the insertion of a pair of oars (not shown) to enable the boat to be propelled. A number of D-rings 11, 12, and 13 may advantageously be secured to the top rail 2 of the boat 1 for supporting auxiliary equipment for driving the boat or for the insertion of rope hawsers and the like.

In the manufacture of the boat 1 according to to the teachings of the invention, a series of pieces of rubberized fabric material are cut in the shapes illustrated in Figs. 11, 12, 13, and 14. The strip of fabric 14 shown in Fig. 11 forms, together with an identically-shaped strip of fabric in reversed form, the bottom half of the bottom rail member 3 of the boat 1. The semi-oval shaped strip of fabric 14 is provided at its ends with curved portions 15 and 16 which terminate in generally concave extremities 17 and 18, respectively. In the forming of the continuous, generally oval-shaped strip of fabric 19 (see Fig. 15) which forms the bottom half of bottom rail member 3 of the boat 1, the second strip of fabric 14 has its ends joined with the first strip of fabric 14 at the concave extremities 17 and 18 thereof, while the material is laid out in flat form upon a suitable table or other working surface.

As will be seen from Fig. 15, the strips 14, when fitted together into the continuous oval-shaped strip of fabric 19, form a comparatively smooth curved portion corresponding to the stern section of the finished boat, while the opposite end of the strip is characterized by an ogivally-shaped portion which becomes the bow of the boat. It will be understood that in view of the curved shape of the extremities 17 and 18 of the two oppositely laid strips of fabric 14, it is necessary to distribute the excess material in the form of small gathers as evenly as possible along the entire length of the joint. The inflation of the completed boat element tends to take up this excess and the finished joint becomes smooth.

Figure 12:
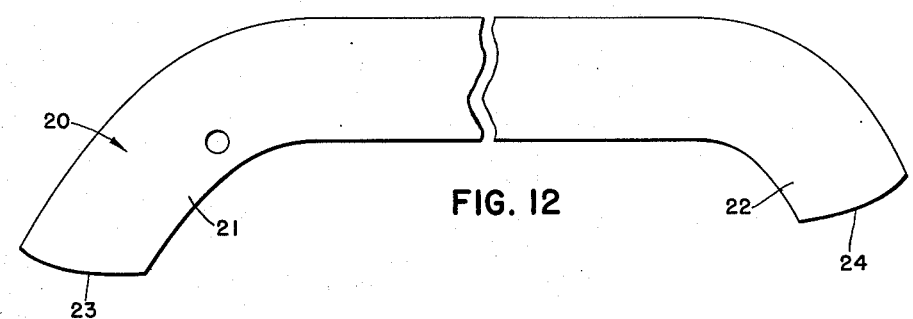

The strip of fabric 20 shown in Fig. 12 forms, together with an identical strip of fabric, the top portion of the bottom rail member 3 of the boat 1 when their curved end portions 21 and 22 are joined together at the extremities 23 and 24 thereof in the shape of a continuous oval-shaped strip of fabric 25. It will be noted that the strip of fabric 20 is provided with convex extremities 23 and 24 on the curved end portions 21 and 22, respectively. These convex extremities 23 and 24 cooperate, in a manner hereinafter to be explained, with the concave ends 17 and 18 of the continuous strip of fabric 19 formed by the joined strips 14 to cause the finished tubular element to be slightly elevated in those portions thereof which form the bow and the stern of the boat 1 upon inflation.

After the first continuous oval-shaped strip of fabric 19 is completed, crotch or reinforcing tapes 26, 27 are secured in place on the fabric strip adjacent to but spaced inwardly from the inner and outer marginal edges 28, 29, respectively, thereof as shown in Figs. 16 and 17. The ends of the reinforcing tapes 26, 27, which are actually narrow bands of rubberized fabric material, are joined by overlapping at some suitable point, as indicated by the reference numerals 30 and 31, along the periphery of the strip of fabric 19. Next, the similar continuous oval-shaped strip of fabric 25 embodying the joined semi-oval pieces 20, is directly superposed on the strip 19 as shown in Figs. 16 and 18.

The folded-over portions of the reinforcing tapes 26, 27 are intimately bonded to the surface of the strip 25 in substantially the same positions with respect to its inner and outer marginal edges 32, 33 as in the case of the strip 19. The fabric adjacent the inner marginal edges 28, 32 and the outer marginal edges 29, 33 is cemented firmly together to form outwardly projecting lip portions 34, 35 as shown in Figs. 4, 5 and 9 upon inflation of rail member 3. It will be understood that the reinforcing tapes 26 and 27 will be unfolded upon inflation of the rail member 3 and thereupon operate in the manner illustrated in Figs. 4, 5, and 9 to seal the joints formed at the lip portions 34 and 35.

In fitting together the several strips of material 14 and 20 at the extremities 17, 18 and 23, 24, respectively, thereof, reinforcing tapes 36 and 37 are employed at the bow and stern, respectively. As will be noted from Fig. 15, the tapes 36 and 37 are secured in place over the overlapped extremities 17 and 18 at the opposite ends of the oval-shaped strip of fabric 19. Portions of the tapes 36 and 37 are permitted to extend beyond the inner and outer peripheral edges 28 and 29 of the strip 19 to enable them to be doubled back upon the secured portions of said tapes. Thus, when the continuous oval-shaped strip 25 is placed over strip 19, the overlapped extremities 23, 24 will also be affixed to the tapes 36, 37 in the manner shown in Fig. 10.

Figure 11:
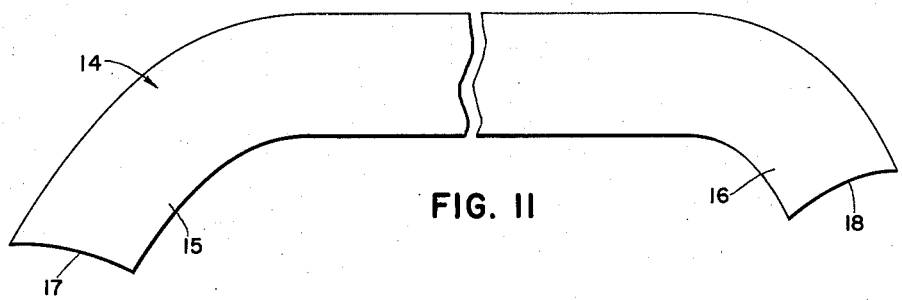
Figure 13:
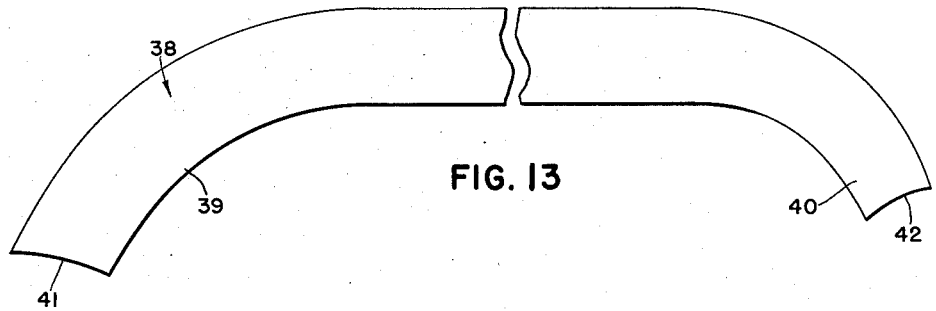

The strip of fabric 38 illustrated in Fig. 13 is generally similar to the strip of fabric 14 of Fig. 11 in that it has curved end portions 39 and 40 which are provided with concave terminating edges 41 and 42, respectively. Two identical strips of fabric material 38, one of which is reversed with respect to the other, will form, upon being joined at the terminating edges 41 and 42 thereof, a continuous, substantially oval-shaped strip of fabric 43 (see Fig. 19) which comprises the bottom portion of the top rail member 2 of the boat 1. The oval-shaped strip of fabric 43 is substantially identical to that shown in Fig. 15.

Figure 14:
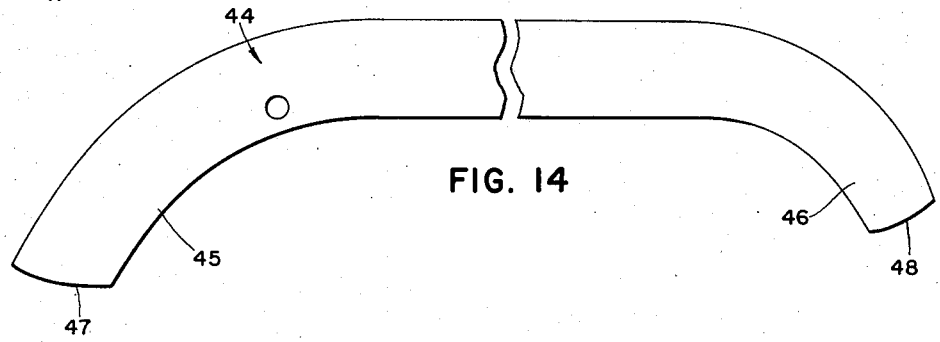
Figure 15:
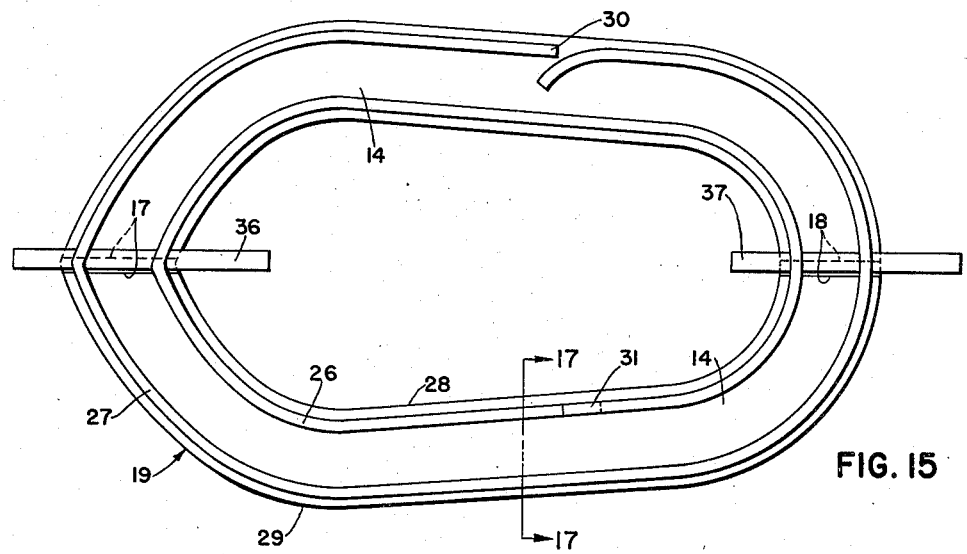

In Fig. 14 of the drawings, the strip of material 44 is generally similar in shape to that of the strip of fabric 20 illustrated in Fig. 12. The strip of fabric 44 is generally semi-oval in shape and is provided with curvilinearly-shaped end portions 45 and 46 which possess terminating edges 47 and 48 of convex form. It will be understood that two identical strips of fabric 44, one of which is reversed with respect to the other, when joined at the terminating convex edges 47 and 48 of the curved portions 45 and 46 thereof, will form a continuous oval-shaped strip of fabric 49 (see Fig. 20) which serves as the top portion of the top rail 2 of the boat when it is assembled.

The fabrication of the top rail 2 embodying the cooperating, continuous generally oval-shaped fabric strips 43 and 49 is substantially identical to that of the botom rail 3 previously described in detail. The reinforcing tapes 50 and 51 are secured to the strip 43 adjacent to, but spaced inwardly from, the inner and outer marginal edges 52 and 53 and the ends of said tapes are joined as at 54 and 55. As in the construction of the bottom rail 3, the reinforcing tapes 56 and 57 are applied to the overlapping ends 41 and 42 of the fabric strip 43 after which the excess material in said tapes is doubled back upon the secured portion.

The continuous oval-shaped strip of fabric 49 embodying the cooperating joined strips of fabric 44 cut in the manner illustrated in Fig. 14, is next superposed on the strip of fabric 43 having the reinforcing tapes 50, 51, 56, and 57 secured thereto. The several parts are then firmly pressed or stitched together and the marginal portions 52, 53, 58, and 59 extending beyond the reinforcing tapes 50 and 51 and adjacent the edges of the material, are cemented together, thus forming the projecting lip portions 60 and 61. The lip portions 60 and 61 are sealed internally of the top rail member 2 by the reinforcing tapes 51 and 50, respectively, in the manner illustrated in Figs. 4 and 5 when the finished rail member is inflated.

Figs. 6, 7, and 8 are illustrative of a typical form of bow or stern joint in the fabrication of either of the endless rail members 2 and 3. It will be noted from Figs. 6 and 7 that the cemented together marginal portions 29 and 33 of the oval-shaped strips of fabric 19 and 25 are separated part way at one end thereof to receive the opposite ends of the same marginal portions when the extremities 17 and 23 of said fabric strips are fitted together and overlapped. The reinforcing tape 36 disposed internally of the finished rail member, in this case bottom rail member 3, serves to seal the overlapping joint between the several fabric strips upon inflation of the member. Fig. 8 illustrates the manner in which the internally disposed reinforcing tape 36 is joined at 62 and how the tape passes under the circumferentially extending tapes 26 and 27.

In the assembly of the boat structure 1, the top rail member 2, as we have noted, is somewhat broader of beam and longer in its axial dimension than the bottom rail member 3 and, therefore, will tend to overhang the bottom rail slightly when it is arranged in vertically stacked relation thereto as indicated in Figs. 3, 4, and 5. When the top rail has been properly positioned with respect to the bottom rail member 3, it is secured in place thereon as by means of a pair of crotch tapes 63 and 64. The top rail member 2 thereby affords not only additional flotation stability to the boat structure 1, but also protects the occupants of the boat against the wash which might otherwise enter the boat when in use on rough water. The floor 4 and its supporting sheet of fabric 6 are held in place upon the bottom portion of the bottom rail member 3 by cementing the marginal portions of the sheet in place and anchoring them as by means of a crotch tape 65 in the manner illustrated in Figs. 3, 4, and 5.

It may be found desirable to employ a scuffing strip 66 which is affixed to the portion of the top rail 3 adjacent the bow of the boat to enable the lip portion 60 to be folded over as indicated in Figs. 4 and 5. This strip 66 is thus adapted to provide a scuffing or wearing surface for the protection of the bow portion of the boat 1 when the boat is moored. Additional patch segments 67, 68, 69, and 70 may be affixed to the uppermost surface of the top rail member 2 for securing the D-rings 11, 12, and 13, as well as the oar locks 10, in position.

As previously indicated, the extremities 17, 18, 41, and 42 of concave form, as well as the extremities 23, 24, 47, and 48 of convex form, are developed from the shape of the joints at the bow and the stern portions of the top and bottom rails 2 and 3 of the boat 1 in the manner illustrated in Fig. 21. It will be understood from this diagrammatic representation which is exaggerated to show more clearly the method of development that when the extremities of the joint are projected upon a plane, the bottom half of the rail member forms a concave pattern while the top half of the rail member forms a convex pattern for the extremities of the strips which are to be united. Thus, it will be seen that the concave extremities 17, 18, 41 and 42 of the strips 14 and 38, respectively, must be cut to the generally concave configuration indicated by the reference numeral 71, while the several extremities 23, 24, 47, and 48 of the fabric strips 20 and 44, respectively, are cut to the convex pattern indicated by the reference numeral 72 in Fig. 21.

In this way, after the several patterns have been fitted together in the manner described in detail, the top and bottom rail members 2 and 3, respectively, present a smooth continuous curved contour extending from the bow to the stern of the boat as distingushed from similar boats embodying multiple rail construction, each rail of which has a plurality of segments in the shape of right cylinders. Moreover, the bow and stern portions of the boat will be elevated slightly upon inflation of the structure. This elevation of the bow and stern portions of the boat greatly facilitates the maneuverability of the boat when in service.

The pieces of fabric employed in the fabrication of the pneumatic boat structure of the present invention are described herein above as being cut to a "semi-oval shape." It will be understood that this nomenclature contemplates a substantially curved piece of material in the form of a generally semi-annular strip (see Figs. 11 to 14, inclusive). According to the procedure described above one of these semi-oval strips is laid out flat and a second identical strip is reversed, laid flat, and joined at its ends with the first strip to form a first generally annular or endless strip (see Fig. 15). A second annular strip identical to the first is superposed upon the first and the two strips are then joined peripherally. The resulting endless tubular member assumes the shape of a modified torus upon inflation.

Numerous modifications of the boat structure may be made without departing from the spirit or scope of the invention. By way of illustration, the boat structure 1 may be made up of any desired number of inflatable rail members arranged in vertically stacked relation. The structure may, for example, have three or more such rail members.

While in accordance with the Patent Statutes one best known embodiment of the invention has been illustrated and described in detail, it is to be particularly understood that the invention is

I claim:

1. In the manufacture of pneumatic boat structures and the like embodying a plurality of stacked inflatable rail members characterized by a substantially continuous curved contour from bow to stern of said boat structure, the method of constructing a rail member comprising the steps of cutting a plurality of pieces of rubberized fabric material to two different patterns; assembling two pieces of the same pattern to form a continuous substantially flat strip of fabric by reversing one of the pieces and joining the ends of the two pieces together; securing reinforcing tapes at the end joints and adjacent but spaced inwardly from the marginal edges of one of the strips of fabric; superposing a second continuous flat strip of fabric on said first strip; and intimately bonding the inner and outer edges of the superposed strips together with the the reinforcing tapes disposed between and bonded to the contacting surfaces of the strips.

2. In the manufacture of pneumatic boat structures and the like embodying a plurality of stacked inflatable rail members characterized by a substantially continuous curved contour from bow to stern of said boat structure, the method of constructing a rail member comprising the steps of cutting from rubberized fabric material a plurality of individual pieces at least two pairs of which are of identical shape; assembling each pair of said pieces to form an endless substantially flat strip by reversing one of the pieces of each pair and joining the ends of the two pieces together; adhesively bonding tapes at each of the end joints of one of the strips and securing a tape to the same surface of this strip adjacent but in spaced relation to the inner and outer periphery thereof; superposing on the first strip a second strip; and intimately bonding together the peripheral edges of both strips with the tapes disposed between the strips and affixed to the contacting surfaces of the strips.

3. In the manufacture of pneumatic boat structures and the like embodying a plurality of stacked inflatable rail members characterized by a substantially continuous curved contour from bow to stern of said boat structure, the method of constructing a rail member comprising the steps of cutting flat pieces of rubberized fabric material to two different patterns, each piece being of substantially semi-oval shape; selecting a set of at least two pieces cut to each pattern; reversing one of the two identical pieces of each set and joining the ends thereof to form in the flat a first continuous, generally oval-shaped strip of fabric; securing reinforcing tapes at the end joints and adjacent but spaced inwardly from the marginal edges of the first of the strips of fabric, all of said tapes being affixed to the same surface of said strip; superposing on the first strip a second continuous strip of fabric assembled from two pieces of fabric of the other pattern in substantially the same fashion as the first strip was formed; and intimately bonding the superposed strips of fabric together with the reinforcing tapes disposed between and bonded to the contacting surfaces of the strips.

4. In the manufacture of pneumatic boat structures and the like embodying a plurality of stacked inflatable rail members characterized by a substantially continuous curved contour from bow to stern of said boat structure, the method of constructing a rail member comprising the steps of cutting four pieces in two pairs of rubberized fabric material to a shape such that at least the end portions thereof are of curvilinear form, the pieces in each pair being of identical configuration; reversing one of the pieces of each pair; joining together the ends of the pieces in each pair of identical pieces to form a closed, substantially curved strip of fabric; laying out one of the closed strips of fabric in substantially flat form; bonding over the end joints of the flat closed strip of fabric a tape having adhesive on one surface thereof and provided with portions extending beyond the edges of the fabric strip, which portions are folded back upon and at least equal in length to the bonded portion thereof; applying in an area uniformly spaced from the inner and outer peripheral edges of the closed strip of fabric additional tapes doubled back upon themselves; superposing the other pair of pieces in the form of a closed strip of fabric upon the first mentioned strip; adhesively bonding together the inner and outer peripheral edges of the superposed closed strips of fabric extending beyond the tapes; and placing the fabric strips into intimate relation.

MARK J. STURTEVANT.

REFERENCES CITED

The following references are of record in the file of this patent:

UNITED STATES PATENTS

| Number | Name | Date |
|---|---|---|
| 671,502 | Sultemeyer | Apr. 9, 1901 |
| 2,408,789 | Luisada | Oct. 8, 1946 |

FOREIGN PATENTS

| Number | Country | Date |
|---|---|---|
| 326,248 | Italy | May 7, 1935 |
| 328,524 | Great Britain | May 1, 1930 |